United States Patent
Drotleff et al.

(10) Patent No.: US 10,773,595 B2
(45) Date of Patent: Sep. 15, 2020

(54) BRAKING SYSTEM FOR A VEHICLE AND METHODS FOR OPERATING A BRAKING SYSTEM OF A VEHICLE

(71) Applicant: Robert Bosch GmbH, Stuttgart (DE)

(72) Inventors: Dirk Drotleff, Oberstenfeld-Gronau (DE); Jochen Bodmann, Oberstenfeld (DE); Stefan Strengert, Stuttgart (DE); Xun Yao, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 30 days.

(21) Appl. No.: 16/302,168

(22) PCT Filed: Mar. 22, 2017

(86) PCT No.: PCT/EP2017/056799
§ 371 (c)(1),
(2) Date: Nov. 16, 2018

(87) PCT Pub. No.: WO2017/198368
PCT Pub. Date: Nov. 23, 2017

(65) Prior Publication Data
US 2019/0270385 A1    Sep. 5, 2019

(30) Foreign Application Priority Data
May 18, 2016    (DE) .......................... 10 2016 208 529

(51) Int. Cl.
*B60L 7/26*    (2006.01)
*B60T 13/16*    (2006.01)
(Continued)

(52) U.S. Cl.
CPC .................. *B60L 7/26* (2013.01); *B60L 7/18* (2013.01); *B60T 8/4872* (2013.01);
(Continued)

(58) Field of Classification Search
CPC ...... B60T 8/4872; B60T 8/4072; B60T 8/267; B60T 8/3655; B60T 2270/604; B60T 2270/608; B60T 13/586; B60T 13/686
See application file for complete search history.

(56) References Cited

U.S. PATENT DOCUMENTS 5,568,962 A * 10/1996 Enomoto .................. B60L 7/26
303/3
6,349,995 B1 * 2/2002 Itoh ....................... B60T 8/3275
188/356

(Continued)

FOREIGN PATENT DOCUMENTS

DE    102008001504 A1    11/2009
DE    102012209663 A1    1/2013
(Continued)

OTHER PUBLICATIONS

International Search Report for PCT/EP2017/056799, dated Jul. 5, 2017.

*Primary Examiner* — Thomas J Williams
*Assistant Examiner* — James K Hsiao
(74) *Attorney, Agent, or Firm* — Norton Rose Fulbright US LLP; Gerard Messina

(57) ABSTRACT

A braking system is described for a vehicle, including a master brake cylinder, a first brake circuit with a first storage chamber, a first wheel brake cylinder, and a second wheel brake cylinder, the first wheel brake cylinder being hydraulically connected to the first storage chamber via a first wheel outlet valve, and the second wheel brake cylinder being hydraulically connected to the first storage chamber
(Continued)

via a second wheel outlet valve, and including a second brake circuit with a second storage chamber, a third wheel brake cylinder, and a fourth wheel brake cylinder, the third wheel brake cylinder being hydraulically connected to the second storage chamber via a third wheel outlet valve, and the fourth wheel brake cylinder being hydraulically connected to the second storage chamber via a fourth wheel outlet valve. The first wheel outlet valve and the third wheel outlet valve are in each case continuously adjustable valves. Moreover, also described is a method for operating a braking system of a vehicle.

14 Claims, 6 Drawing Sheets

(51) Int. Cl.
 *B60T 13/58* (2006.01)
 *B60L 7/18* (2006.01)
 *B60T 13/68* (2006.01)
 *B60T 8/48* (2006.01)
 *B60T 8/36* (2006.01)

(52) U.S. Cl.
 CPC .......... *B60T 13/161* (2013.01); *B60T 13/586* (2013.01); *B60T 13/686* (2013.01); *B60T 8/3655* (2013.01); *B60T 2270/604* (2013.01); *B60T 2270/608* (2013.01)

(56) References Cited

U.S. PATENT DOCUMENTS

| | | | |
|---|---|---|---|
| 8,950,826 B2* | 2/2015 | Kunz | B60T 8/348 303/10 |
| 2002/0158510 A1* | 10/2002 | Kobayashi | B60T 8/3265 303/155 |
| 2004/0239177 A1* | 12/2004 | Kusano | B60T 7/12 303/119.1 |
| 2005/0200199 A1* | 9/2005 | Kamiya | B60T 7/065 303/191 |
| 2010/0276239 A1* | 11/2010 | Wuerth | B60T 8/266 188/358 |
| 2011/0108375 A1* | 5/2011 | Wuerth | B60T 8/1766 188/106 P |
| 2012/0126610 A1* | 5/2012 | Nakata | B60T 1/10 303/9.63 |
| 2013/0057052 A1* | 3/2013 | Kunz | B60T 8/267 303/3 |
| 2013/0062931 A1* | 3/2013 | Kunz | B60T 8/348 303/3 |
| 2013/0292999 A1* | 11/2013 | Strengert | B60T 8/246 303/10 |
| 2014/0244127 A1* | 8/2014 | Strengert | B60T 1/10 701/70 |
| 2015/0232076 A1 | 8/2015 | Oosawa | |

FOREIGN PATENT DOCUMENTS

| | | |
|---|---|---|
| DE | 102012222978 A1 | 6/2014 |
| JP | 2014519437 A | 8/2014 |
| WO | 2004101308 A1 | 11/2004 |
| WO | 2013017314 A2 | 2/2013 |

\* cited by examiner

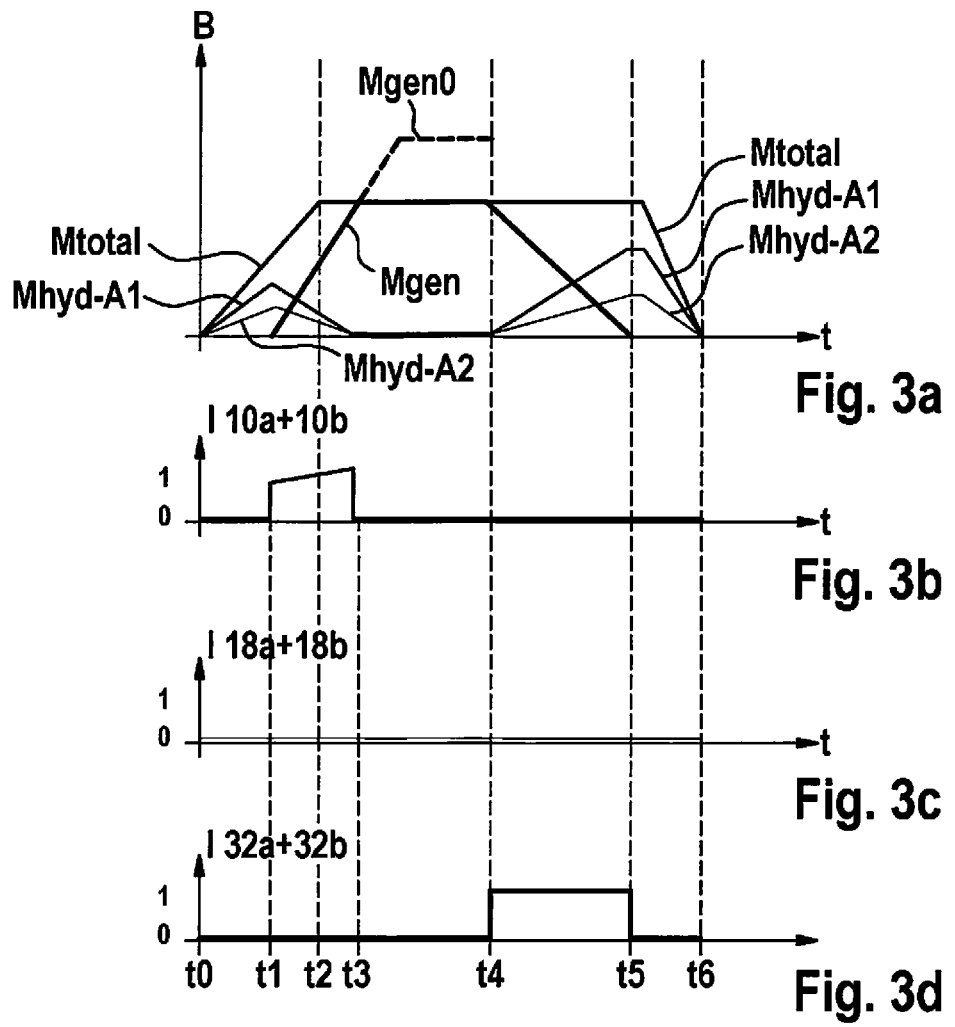
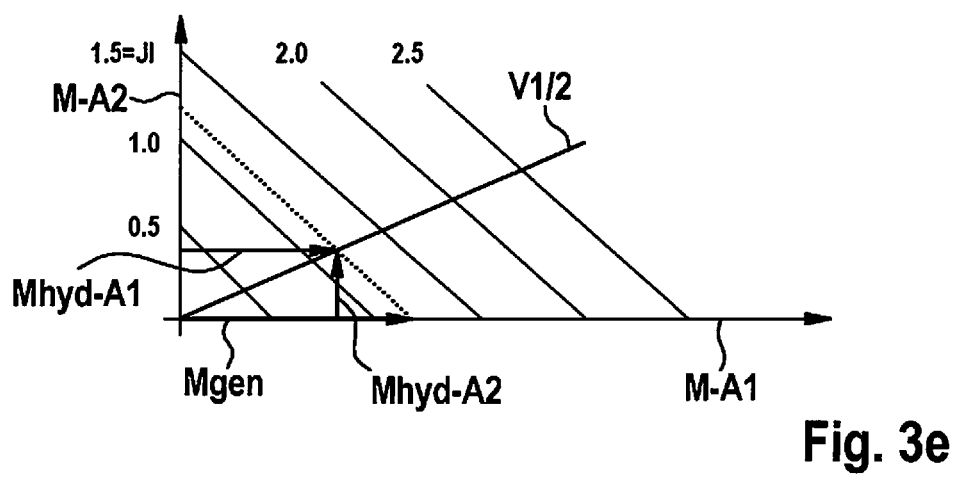

BRAKING SYSTEM FOR A VEHICLE AND METHODS FOR OPERATING A BRAKING SYSTEM OF A VEHICLE

FIELD OF THE INVENTION

The present invention relates to a braking system for a vehicle. Moreover, the present invention relates to methods for operating a braking system of a vehicle.

BACKGROUND INFORMATION

A method for operating a braking system of a vehicle and a control device for this type of braking system are described in German Published Patent Application No. 10 2012 222 978. The braking system in question includes a master brake cylinder and two brake circuits, each with a storage chamber and two wheel brake cylinders, a wheel outlet valve designed as a switching valve being associated with each of the wheel brake cylinders. By opening at least one of the wheel outlet valves for each brake circuit, the aim is to prevent an increase in brake pressure in the particular brake circuit, despite an actuation of a brake pedal, connected to the master brake cylinder, by a driver of the vehicle.

SUMMARY

The present invention provides a braking system for a vehicle, a method for operating a braking system of a vehicle, and a method for operating a braking system of a vehicle.

As described in greater detail below, designing at least one of the two wheel brake cylinders of each of the two brake circuits of the braking system according to the present invention as continuously adjustable valves provides additional options for limiting/preventing a brake pressure buildup in the wheel brake cylinders of the braking system during actuation of the brake actuating element by the driver. The continuously adjustable valve in question is understood to mean a type of valve which, in addition to its closed state and a (completely) open state, is also controllable/switchable into a partially open state. With the aid of this type of valve for at least the first wheel outlet valve of the first brake circuit and the third wheel outlet valve of the second brake circuit of the braking system according to the present invention, an "electric design" of a free travel in the braking system according to the present invention (independent from mechanical free travel) is possible which is suitable for an X brake circuit division as well as for a parallel brake circuit division. In addition, with the aid of the "electric design" of the free travel in all deceleration ranges, it is possible to completely prevent a brake pressure buildup in the wheel brake cylinders of the braking system according to the present invention, despite braking by the driver into the master brake cylinder. Furthermore, the present invention also makes a (complete) brake pressure reduction possible in the wheel brake cylinders of the braking system according to the present invention during a brake application.

Due to its advantageous properties, the braking system according to the present invention is particularly well suited for use in a vehicle that includes at least one generator for recovering kinetic energy via recuperative braking. Recuperative braking is understood to mean an operation in which at least one electric motor, as the at least one generator which may also be usable as at least one electric drive motor of the vehicle, is operated in generator mode in such a way that a braking torque is effectuated with the aid of the at least one electric motor/generator. Electrical energy that is recovered in this way may be fed back into a store and used later, for example for re-accelerating the vehicle. The braking system according to the present invention is therefore particularly well suited for use in a hybrid vehicle or in an electric vehicle. Due to cooperation of the braking system according to the present invention with the at least one generator of the vehicle, energy consumption of the particular vehicle is reducible, and pollutant emissions from the particular vehicle during travel are also often reducible.

Since in the braking system according to the present invention, additional implementation options for limiting/suppressing a brake pressure buildup in its wheel brake cylinders during the actuation of the brake actuating element by the driver are provided, at least a comparatively high proportion of the setpoint total brake force requested by actuating the brake actuating element may be achieved with the aid of the recuperative braking action without exceeding the setpoint total brake force. The cooperation of the braking system according to the present invention with the at least one generator thus results in a comparatively high recuperative efficiency, in particular, frequently a recuperative efficiency of 100%. The disadvantages of mechanical free travel, such as the comparatively high design complexity for implementing the mechanical free travel in a conventional braking system, do not have to be accepted when making use of the braking system according to the present invention.

In one advantageous specific embodiment of the braking system, the second wheel brake cylinder and the fourth wheel brake cylinder are in each case switching valves. This particular switching valve is understood to mean a type of valve that is switchable only into its closed state and into its (completely) open state. Thus, for the second wheel brake cylinder and the fourth wheel brake cylinder, a cost-effective type of valve may be used without this resulting in disadvantages for the braking system according to the present invention.

The braking system preferably includes a control device which, if a setpoint total brake force requested by a driver of the vehicle via his/her actuation of a brake actuating element connected to the master brake cylinder is achievable, at least partially, with the aid of at least one generator of the vehicle, is designed for controlling at least the first wheel outlet valve and the third wheel outlet valve into an at least partially open state in each case, so that at least a portion of a brake fluid volume that is displaced from the master brake cylinder into the first brake circuit by actuating the brake actuating element is transferable into the first storage chamber, and at least a portion of a brake fluid volume that is displaced from the master brake cylinder into the second brake circuit by actuating the brake actuating element is transferable into the second storage chamber. The braking effect of the wheel brake cylinders that is reduced/suppressed in this way may be utilized for converting kinetic energy into electrical energy with the aid of the at least one generator without exceeding the requested setpoint total brake force. Thus, the driver continues to have a standard braking feel despite the power recuperation.

In particular, the control device may be designed to ascertain, taking into account a brake actuation intensity signal concerning an actuation intensity of the actuation of the brake actuating element by the driver, whether the requested setpoint total brake force is at least partially achievable with the aid of the at least one generator, and, if necessary, to control the at least one generator in such a way that the requested setpoint total brake force is at least partially achievable with the aid of the at least one generator.

A (dedicated) controller for the at least one generator may be dispensed with due to this multifunctionality of the control device.

In one advantageous specific embodiment, the control device, with the first wheel outlet valve closed, the second wheel outlet valve as a switching valve closed, the third wheel outlet valve closed, and the fourth wheel outlet valve as a switching valve closed, is designed to compare at least one pressure signal concerning at least one pressure in at least a partial volume of the braking system to at least one predefined threshold value signal, prior to controlling at least the first wheel outlet valve and the third wheel outlet valve into an at least partially open state in each case, and if the at least one pressure signal is below the at least one threshold value signal, to control the first wheel outlet valve, the second wheel outlet valve, the third wheel outlet valve, and the fourth wheel outlet valve into an at least partially open state in each case, and otherwise, to control only the first wheel outlet valve and the third wheel outlet valve into an at least partially open state in each case, and to keep the second wheel outlet valve and the fourth wheel outlet valve closed. While pressure relief via the wheel outlet valves is generally no longer possible when hydraulic brake pressure is present in a braking system of the related art for reasons of noise vibration harshness (NVH), with the aid of this specific embodiment of the present invention a brake pressure reduction may still be achieved, even when there is significant pressure in at least the partial volume of the braking system. In particular, an increasing braking effect of the at least one generator is still blendable with the aid of a brake pressure reduction in the wheel brake cylinders without concern for a "plop" sound, even for a generator with delayed start-up or with an increase in the maximum achievable recuperative brake force.

The control device, as long as the requested setpoint total brake force is below a maximum achievable recuperative brake force with the aid of the at least one generator, is preferably also designed to control at least the first wheel outlet valve and the third wheel outlet valve into an at least partially open state in each case, and to control the at least one generator in such a way that the requested setpoint total brake force is achieved with the aid of the at least one generator, and as soon as the requested setpoint total brake force exceeds the maximum achievable recuperative brake force, to control the first wheel outlet valve, the second wheel outlet valve, the third wheel outlet valve, and the fourth wheel outlet valve into a closed state, and, while one brake circuit of the two brake circuits remains connected, via its open changeover valve, to the master brake cylinder, to decouple the other brake circuit of the two brake circuits from a master brake cylinder pressure in the master brake cylinder by closing its changeover valve, it being possible to set or build up a brake pressure in the wheel brake cylinders of the decoupled brake circuit that corresponds to a deviation of a sum of a generator brake force of the at least one generator and a hydraulic partial brake force of the wheel brake cylinders of the brake circuit connected to the master brake cylinder, from the requested setpoint total brake force. Thus, even when the setpoint total brake force exceeds the maximum achievable recuperative brake force, a comparatively high proportion of this brake force may still be utilized for recovering electrical energy, while at the same time, the requested setpoint total brake force is fully achievable with the aid of a brake pressure buildup in the wheel brake cylinders of the connected brake circuit and a (generally increased) brake pressure buildup in the wheel brake cylinders of the decoupled brake circuit.

If a generator brake force distribution that is effectuated on a first axle and a second axle of the vehicle with the aid of the at least one generator deviates from a predefined setpoint brake force distribution, the control device, as soon as the requested setpoint total brake force exceeds the maximum achievable recuperative brake force, is preferably designed, while the brake circuit of the two brake circuits that is associated with one axle of the two axles that is decelerated more intensely for the generator brake force distribution than for the setpoint brake force distribution remains connected, with the aid of its open changeover valve, to the master brake cylinder, to decouple, with the aid of its closed changeover valve, the other brake circuit of the two brake circuits, associated with the other axle of the two axles, that is decelerated less for the generator brake force distribution than for the setpoint brake force distribution, from the master brake cylinder pressure/pressure in the master brake cylinder. The (generally increased) brake pressure buildup in the wheel brake cylinders of the decoupled brake circuit may thus be utilized for improving a brake force distribution that is present. Thus, despite the deviation of the generator brake force distribution from the setpoint brake force distribution, overbraking of one axle of the two axles may be significantly reduced by compensating for the deviation of the generator brake force distribution from the setpoint brake force distribution by an optimized distribution of the brake pressures in the wheel brake cylinders. (The "deviation" of the generator brake force distribution from the predefined setpoint brake force distribution may also be understood as the normal case/special case that the at least one generator acts on only one of the two axles.)

As one advantageous refinement, the control device, as soon as the maximum achievable recuperative brake force decreases, may be designed to control pumps in such a way that an (additional) brake fluid volume that is displaced and released by the driver is conveyable from the first storage chamber and the second storage chamber with the aid of the pumps, and by closing or keeping closed only one changeover valve of the changeover valves, to set the brake pressure in the wheel brake cylinders of the decoupled brake circuit in such a way that it corresponds to a deviation of a sum of the generator brake force and the hydraulic partial brake force of the wheel brake cylinders of the brake circuit connected to the master brake cylinder, from the requested setpoint total brake force. With the aid of this procedure, the brake pressures in the wheel brake cylinders may be increased to the same target brake pressure, after which controlling the changeover valves is no longer necessary. The braking system may thus advantageously respond to a decrease in the maximum achievable recuperative brake force.

The advantages described above are also achieved when a corresponding method for operating a braking system of a vehicle is carried out. It is pointed out that the method for operating a braking system of a vehicle according to the specific embodiments of the braking system described above may be refined.

BRIEF DESCRIPTION OF THE DRAWINGS

FIGS. 3a through 3e show coordinate systems for explaining a second specific embodiment of the method for operating a braking system of a vehicle.

DETAILED DESCRIPTION

Figure 1:
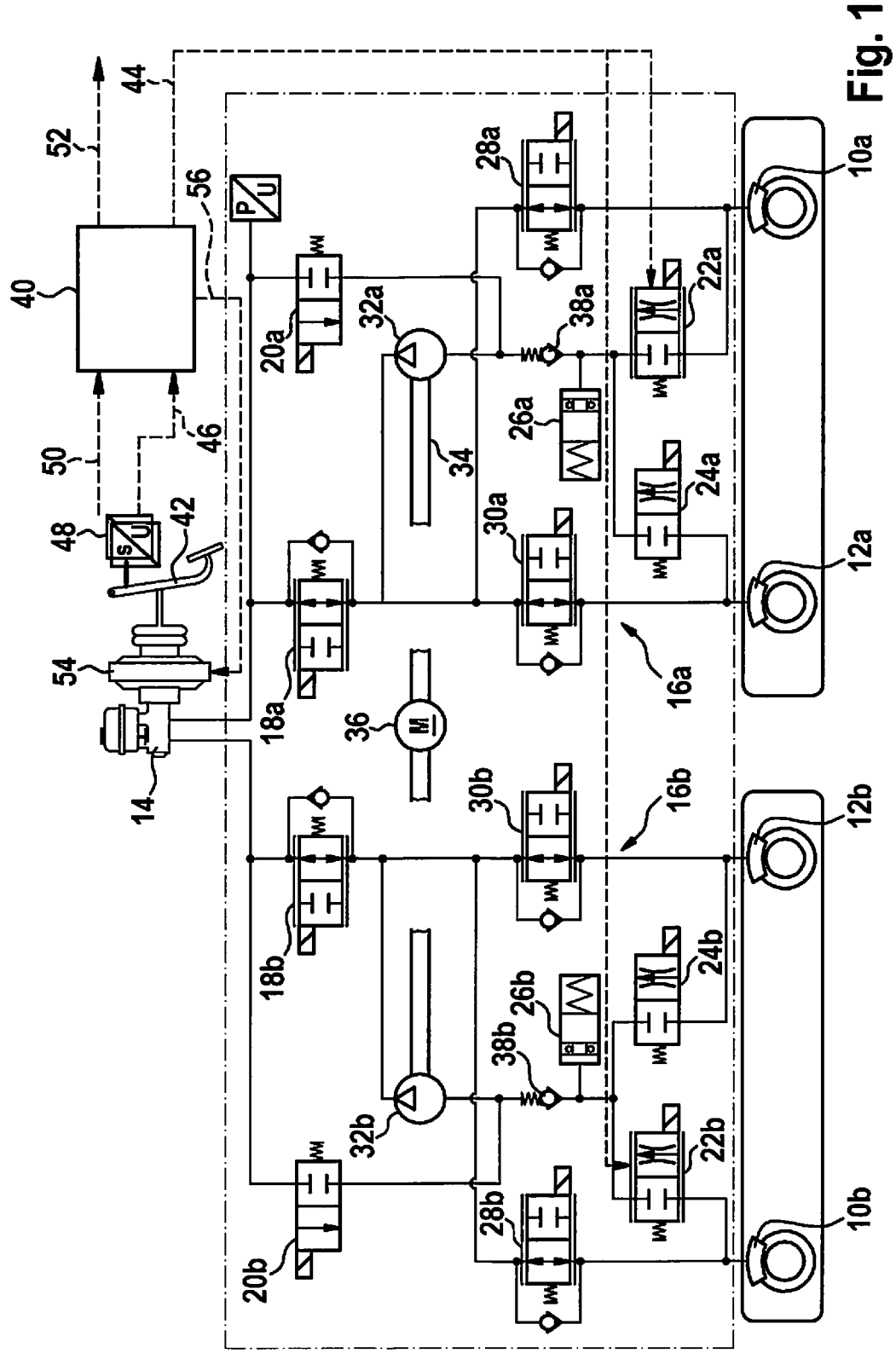
FIG. 1 shows a schematic illustration of one specific embodiment of the braking system for a vehicle.

FIG. 1 shows a schematic illustration of one specific embodiment of the braking system for a vehicle.

The braking system schematically illustrated in FIG. 1 may cooperate with at least one generator in a particularly advantageous manner for recuperative braking of a vehicle. The braking system in FIG. 1 is therefore advantageously usable in an electric vehicle or in a hybrid vehicle. However, it is pointed out that usability of the braking system is not limited to a specific type of vehicle/motor vehicle. In addition, the braking system may be used in vehicles with front-wheel drive as well as in vehicles with rear-wheel drive or in vehicles with all-wheel drive. An assignment of wheels of the particular vehicle to wheel brake cylinders 10a, 10b, 12a, and 12b of the braking system in FIG. 1 may optionally be an X brake circuit division or a parallel brake circuit division (II brake circuit division).

The braking system includes a master brake cylinder 14, a first brake circuit 16a with a first wheel brake cylinder 10a and a second wheel brake cylinder 12a, and a second brake circuit 16b with a third wheel brake cylinder 10b and a fourth wheel brake cylinder 12b. As an example, wheel brake cylinders 10a and 12a of first brake circuit 16a are connected to master brake cylinder 14 via a first changeover valve 18a. Similarly, wheel brake cylinders 10b and 12b of second brake circuit 16b may also be connected to master brake cylinder 14 via a second changeover valve 18b. At least one of brake circuits 16a and 16b may also optionally include a high-pressure switching valve 20a and 20b that is connected to master brake cylinder 14 in parallel to its changeover valve 18a or 18b.

First wheel brake cylinder 10a is connected via a first wheel outlet valve 22a, and second wheel brake cylinder 12a is connected via a second wheel outlet valve 24a, to a first storage chamber 26a of first brake circuit 16a. Similarly, third wheel brake cylinder 10b is connected via a third wheel outlet valve 22b, and fourth wheel brake cylinder 12b is connected via a fourth wheel outlet valve 24b, to a second storage chamber 26b of second brake circuit 16b. In addition, first wheel outlet valve 22a and third wheel outlet valve 22b are in each case a continuously adjustable/controllable valve (pressure relief valve). As explained in greater detail below, the design of first wheel brake cylinder 22a and of third wheel brake cylinder 22b may be utilized in each case as a continuously adjustable valve for a plurality of advantageous processes for reducing or preventing a brake pressure buildup in wheel brake cylinders 10a, 10b, 12a, and 12b of the braking system, despite an increase in a master brake cylinder pressure in master brake cylinder 14.

Second wheel brake cylinder 24a and fourth wheel brake cylinder 24b are preferably switching valves in each case. A cost-effective type of valve may thus be utilized for second wheel brake cylinder 24a and fourth wheel brake cylinder 24b.

Wheel brake cylinders 10a and 12a or 10b and 12b of at least one of brake circuits 16a and 16b may optionally be connected to changeover valve 18a or 18b of its brake circuit 16a or 16b and/or to master brake cylinder 14 via at least one wheel inlet valve 28a, 28b, 30a, and 30b. In particular, one wheel inlet valve 28a, 28b, 30a, and 30b may be associated with each wheel brake cylinder 10a, 10b, 12a, and 12b, respectively. However, equipping the braking system described here with four wheel inlet valves 28a, 28b, 30a, and 30b may also be dispensed with, and two wheel inlet valves 28a, 28b, 30a, and 30b are also generally sufficient.

In the specific embodiment in FIG. 1, each of brake circuits 16a and 16b is also equipped with one pump 32a or 32b. A suction side of first pump 32a of first brake circuit 16a is connected to first storage chamber 26a (preferably via a first check valve 38a), while a delivery side of first pump 32a is connected to first changeover valve 18a and to the at least one wheel inlet valve 28a and 30a of first brake circuit 16a and/or to first wheel brake cylinder 10a and to second wheel brake cylinder 12a. Also for second pump 32b of second brake circuit 16b, it is preferred when its suction side is connected to second storage chamber 26b (via a second check valve 38b, for example) and its delivery side is connected to second changeover valve 18b and to the at least one wheel inlet valve 28b and 30b of second brake circuit 16b, and/or to third wheel brake cylinder 10b and to fourth wheel brake cylinder 12b. Pumps 32a and 32b of both brake circuits 16a and 16b are preferably operable with the aid of a shared shaft 34 of a pump motor 36. Alternatively, however, equipping at least one of brake circuits 16a and 16b with a pump 32a or 32b may also be dispensed with.

In the specific embodiment in FIG. 1, the braking system also includes a control device 40 which, if a setpoint total brake force that is requested by a driver of the vehicle by the driver's actuation of a brake actuating element 42 connected to master brake cylinder 14 is at least partially achievable with the aid of at least one generator (not illustrated) of the vehicle, is designed to control at least first wheel outlet valve 10a and third wheel outlet valve 10b into an at least partially open state in each case. (One advantageous procedure for setting the number of opened wheel outlet valves is described below.) This may take place, for example, by outputting at least one opening signal 44 at least to first wheel outlet valve 10a and to third wheel outlet valve 10b. In particular, outputting the at least one opening signal 44 may constitute energizing at least wheel outlet valves 10a and 10b, which are each designed as valves that are closed in the de-energized state. In this way, it may yield that at least a portion of a brake fluid volume that is displaced from master brake cylinder 14 into first brake circuit 16a by actuating brake actuating element 42 is transferred into first storage chamber 26a. Similarly, it is also ensured that at least a portion of a brake fluid volume that is displaced from master brake cylinder 14 into second brake circuit 16b by actuating brake actuating element 42 is transferred/transferable into second storage chamber 26b. A braking effect of wheel brake cylinders 10a, 10b, 12a, and 12b of the braking system that is reduced/eliminated in this way may be utilized for recuperative braking of the vehicle thus equipped with the at least one generator, without exceeding the predefined setpoint total brake force. Instead, an instantaneously achieved deceleration of the vehicle corresponds to the setpoint total brake force that is requested by the driver by the driver's actuation of brake actuating element 42. The driver thus has a standard braking feel despite the recuperative braking that is carried out.

For example, control device 40 is designed to ascertain whether the requested setpoint total brake force is at least partially achievable with the aid of the at least one generator, taking into account a brake actuation intensity signal 46 (of a sensor 48) concerning an actuation intensity of the actuation of brake actuating element 42 by the driver. For this purpose, a piece of information 50 concerning a maximum recuperative brake force that is achievable with the aid of the at least one generator may be provided to control device 40.

Control device 40 may optionally be designed to control the at least one generator with the aid of a generator control signal 52 in such a way that the requested setpoint total brake force is at least partially achievable with the aid of the at least one generator. In addition, a brake booster 54 (for example, an electromechanical brake booster/iBooster), situated between brake actuating element 42 and master brake cylinder 14, may be controllable with the aid of a brake booster control signal 56 of control device 40, as described in greater detail below.

Control device 40 may in particular be designed to carry out the method described below.

FIGS. 2A through 2D show schematic illustrations of braking systems and coordinate systems for explaining a first specific embodiment of the method for operating a braking system of a vehicle.

The braking system in FIG. 1 is used by way of example in the method described below (see FIGS. 2Aa, 2Ba, 2Ca, and 2Da). However, it is pointed out that practicability of the method described below is not limited to the use of this type of braking system. For example, many of the method steps described below may also be carried out with one switching valve each as first wheel outlet valve 10a and third wheel outlet valve 10b. Likewise, strictly by way of example, wheel brake cylinders 10a and 12a of first brake circuit 16a are associated with a first axle A1, and wheel brake cylinders 10b and 12b of second brake circuit 16b are associated with a second axle A2. First axle A1 may be a front axle, for example, while second axle A2 is a rear axle. Bars B-10a and B-12a illustrated in FIGS. 2Aa, 2Ba, 2Ca, and 2Da depict the braking torques that are exerted on first axle A1 with the aid of wheel brake cylinders 10a and 12a of first brake circuit 16a. Similarly, the braking torques that are exerted on second axle A2 with the aid of wheel brake cylinders 10b and 12b of second brake circuit 16b are indicated by bars B-10b and B-12b in FIGS. 2Aa, 2Ba, 2Ca, and 2Da. A total first axle partial braking torque M-A1 (in meters/second$^2$) exerted on first axle A1 is illustrated on the abscissas of the coordinate systems in FIGS. 2Ab, 2Bb, 2Cb, and 2Db, while the ordinates of the coordinate systems in FIGS. 2Ab, 2Bb, 2Cb, and 2Db depict a total second axle partial braking torque M-A2 (in meters/second$^2$) exerted on second axle A2.

When the method is being carried out, when a brake actuating element 42, connected to master brake cylinder 14, is actuated by the driver of the vehicle it is ascertained whether a setpoint total brake force (or a correspondingly requested setpoint total braking torque Mtotal) requested by the driver by actuating brake actuating element 42 is at least partially achievable with the aid of at least one generator (not illustrated) of the vehicle. If the requested setpoint total brake force is at least partially achievable with the aid of the at least one generator, the at least one generator is controlled/actuated in such a way that the requested setpoint total brake force is at least partially achieved with the aid of a generator brake force (or with the aid of a generator braking torque Mgen) of the at least one generator. (The areas plotted into bars B-10a, B-10b, B-12a, and B-12b in FIG. 2Aa show a first generator partial braking torque Mgen-A1 exerted on first axle A1 with the aid of the at least one generator, or a second generator partial braking torque Mgen-A2 exerted on second axle A2 with the aid of the at least one generator.)

If the requested setpoint total brake force is at least partially achieved with the aid of the at least one generator, in order to transfer at least a portion of a brake fluid volume, displaced from master brake cylinder 14 into first brake circuit 16a by actuating brake actuating element 42, into first storage chamber 26a, at least first wheel outlet valve 22a of first brake circuit 16a is opened. Similarly, in order to transfer at least a portion of a brake fluid volume, displaced from master brake cylinder 14 into second brake circuit 16b by actuating brake actuating element 42, into second storage chamber 26b, at least third wheel outlet valve 22b of second brake circuit 16b is opened. For noise vibration harshness (NVH) reasons, opening only first wheel outlet valve 22a and third wheel outlet valve 22b is often advantageous. If a rapid transfer of brake fluid is desired, it is also possible to open all wheel outlet valves 22a, 22b, 24a, and 24b. (One advantageous procedure for setting the number of wheel outlet valves that are opened is described in greater detail below.)

If no displacement of brake fluid volume into storage chambers 26a and 26b were to take place during the actuation of brake actuating element 42, the actuation of brake actuating element 42 would effectuate a pressure buildup in the braking system, and thus, a pressure counterforce which the driver would have to overcome with the aid of driver brake force Ff in order to further adjust brake actuating element 42. Since in the method stage in FIGS. 2Aa and 2Ab, the brake fluid volume displaced from master brake cylinder 14 by the driver is at least partially discharged into storage chambers 26a and 26b and the pressure counterforce is therefore reduced or discontinued, the reduced or discontinued pressure counterforce is preferably at least partially compensated for by reducing a boosting force of a brake booster 54 (which assists, in terms of force, in the actuation of brake actuating element 42 by the driver), or with the aid of a counterforce of brake booster 54 (which counteracts the actuation of brake actuating element 42 by the driver). Thus, despite the discharge of brake fluid into storage chambers 26a and 26b, the driver still has a standard brake actuation feel (pedal feel). The method described here may also be carried out in a braking system that includes a vacuum brake booster, in this case the method preferably being applied only below the "jump-in" range (i.e., a specific pressure range).

In the method explained with the aid of FIGS. 2A through 2D, as long as the requested setpoint total brake force (i.e., requested setpoint total braking torque Mtotal) is below a maximum achievable recuperative brake force with the aid of the at least one generator (i.e., a corresponding maximum achievable recuperative braking torque Mgen0), the at least one generator is controlled/operated in such a way that the requested setpoint total brake force (virtually 100%) is achieved with the aid of the generator brake force (i.e., generator braking torque Mgen) of the at least one generator. (This is the case in the method stage illustrated with the aid of FIGS. 2Aa and 2Ba.) In this case as well, a buildup of hydraulic pressures in all wheel brake cylinders 10a, 10b, 12a, and 12b of the braking system is reliably prevented/preventable in that the brake fluid volume that is displaced from master brake cylinder 14 via at least first wheel outlet valve 22a and third wheel outlet valve 22b is discharged into storage chambers 26a and 26b. The eliminated counterforce is preferably simulated with the aid of brake booster 54 in such a way that driver brake force Ff to be applied by the driver for adjusting brake actuating element 42 continues to correspond to a standard characteristic curve.

Figure 2A:
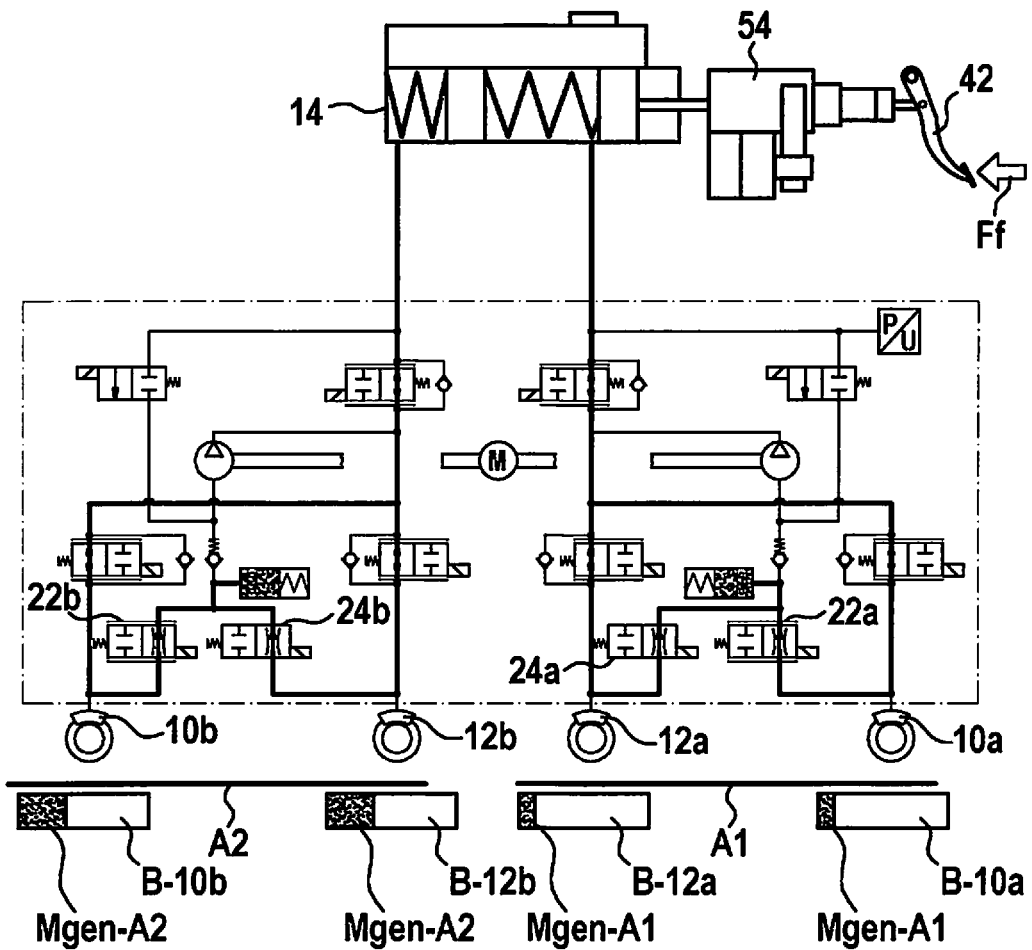
FIGS. 2A through 2D show schematic illustrations of braking systems and coordinate systems for explaining a first specific embodiment of the method for operating a braking system of a vehicle.
Figure 2A:
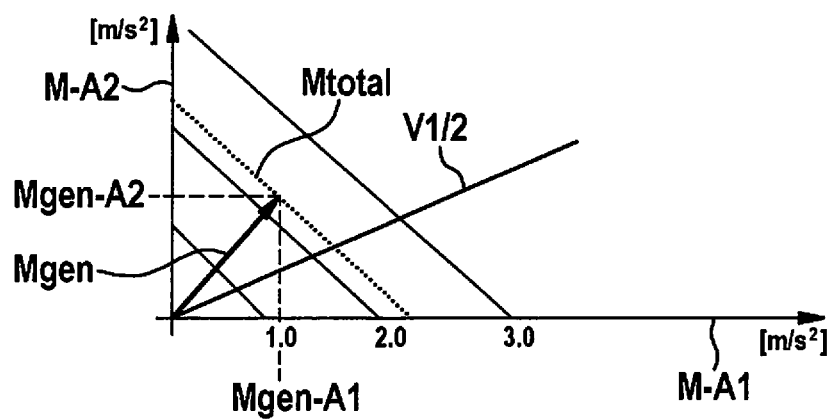

In the coordinate system in FIG. 2Ab, it is apparent that a generator brake force distribution or generator braking torque distribution (i.e., a ratio of first generator partial braking torque Mgen-A1 to second generator partial braking torque Mgen-A2) effectuated with the aid of the at least one generator deviates from a predefined setpoint brake force distribution, i.e., a predefined setpoint braking torque distribution V1/2. For example, the vehicle is an all-wheel drive vehicle having a rear-biased (drive) torque distribution that is achieved with the aid of the at least one generator.

As soon as the requested setpoint total brake force exceeds the maximum achievable recuperative brake force, first wheel outlet valve 22a, second wheel outlet valve 24a, third wheel outlet valve 22b, and fourth wheel outlet valve 24b are controlled into a closed state. (This is the case in a method stage illustrated with the aid of FIGS. 2Ba and 2Bb.) In addition, a brake pressure buildup is initiated in all wheel brake cylinders 10a, 10b, 12a, and 12b, so that with the aid of a first hydraulic partial brake force (i.e., a first hydraulic partial braking torque Mhyd-A1) of wheel brake cylinders 10a and 12a of first brake circuit 16a on first axle A1, and a second hydraulic partial brake force (i.e., a second hydraulic partial braking torque Mhyd-A2) of wheel brake cylinders 10b and 12b of second brake circuit 16b on second axle A2, which together result in a hydraulic brake force (i.e., a corresponding hydraulic braking torque Mhyd), the requested setpoint total brake force (i.e., requested setpoint total braking torque Mtotal) continues to be maintained, despite a generator brake force which at most is the maximum achievable recuperative brake force (i.e., a generator braking torque which at most is maximum achievable recuperative braking torque Mgen0).

Driver brake force Ff is also utilized for this purpose. A brake circuit 16b of the two brake circuits 16a and 16b remains connected, via its open changeover valve 18b, to master brake cylinder 14. A brake pressure in wheel brake cylinders 10b and 12b of brake circuit 16b connected to master brake cylinder 14 thus corresponds to a master brake cylinder pressure in master brake cylinder 14. In addition, the other brake circuit 16a of the two brake circuits 16a and 16b is decoupled from master brake cylinder 14 by closing its changeover valve 18a; in wheel brake cylinders 10a and 12a of decoupled brake circuit 16a, a brake pressure is set ("enclosed") or built up which corresponds to a deviation of a sum of the generator brake force and the hydraulic partial brake force of wheel brake cylinders 10b and 12b of brake circuit 16b connected to master brake cylinder 14, from the requested setpoint total brake force (i.e., a deviation of a sum of generator braking torque Mgen and hydraulic partial braking torque Mhyd-A2 of wheel brake cylinders 10b and 12b of brake circuit 16b connected to master brake cylinder 14, from requested setpoint total braking torque Mtotal). (The brake pressure in wheel brake cylinders 10a and 12a of decoupled brake circuit 16a is thus set in such a way that it effectuates a hydraulic partial braking torque Mhyd-A1 of wheel brake cylinders 10a and 12a of decoupled brake circuit 16a that is (virtually) equal to the deviation of the sum of generator braking torque Mgen and hydraulic partial braking torque Mhyd-A2 of wheel brake cylinders 10b and 12b of brake circuit 16b connected to master brake cylinder 14, from requested setpoint total braking torque Mtotal.) In the graphically depicted situation, driver brake force Ff remains constant (there is a constant driver braking intent). Thus, driver brake force Ff is (almost) always sufficient to effectuate the desired target hydraulic pressure.

If driver brake force Ff is not sufficient to effectuate the requested setpoint total brake force, pumps 32a and 32b are controlled to pump brake fluid from the particular associated storage chamber 26a and 26b. (Only when the driver increases his/her braking intent and thus introduces volume into the braking system can this be used to apply an increase in the hydraulic brake force. Otherwise, pumps 32a and 32b must be controlled in such a way that the previously discharged volume in storage chambers 26a and 26b generates a hydraulic brake pressure buildup. For the hydraulic brake pressure buildup, volume is displaced from storage chambers 26a and 26b into wheel brake cylinders 10a and 12a with the aid of pumps 32a and 32b.) Pump 32a of decoupled brake circuit 16a delivers directly into associated wheel brake cylinders 10a and 12a, while pump 32b of brake circuit 16b connected to master brake cylinder 14 also delivers into master brake cylinder 14, and thus contributes to the increase in the master brake cylinder pressure. (Due to their mechanical coupling via pump motor 36, both pumps 32a and 32b deliver the same volume of brake fluid from their associated storage chambers 26a and 26b. However, a compensation for the different volume requirements of the two brake circuits 16a and 16b takes place via a floating piston installed in master brake cylinder 14.)

In addition, with the aid of brake booster 54 it may be ensured that the driver does not perceive the brake fluid delivery from storage chambers 26a and 26b. Similarly, with a vacuum brake booster, by limiting carrying out of the method to the jump-in range it may be ensured that the driver does not perceive the brake fluid delivery from storage chambers 26a and 26b.

The driver's braking intent may thus continue to be reliably carried out, despite the requested setpoint total brake force exceeding the maximum achievable recuperative brake force. In addition, a comparatively large proportion of the setpoint total brake force may be achieved by the at least one generator with the aid of the recuperative braking, so that a relatively large amount of kinetic energy of the vehicle continues to be converted into storable electrical energy. Since with the procedure described here the driver may brake into both brake circuits 16a and 16b at any time, a hydraulic load of pumps 32a and 32b and of pump motor 36 is reduced significantly (in particular compared to a brake-by-wire or a single axle brake-by-wire braking system).

In the procedure described here, brake circuit 16b of the two brake circuits 16a and 16b, which is associated with one axle A2 of the two axles A1 and A2 and which is decelerated more intensely for the generator brake force distribution than for the setpoint brake force distribution (i.e., is decelerated more intensely for the generator braking torque distribution than for setpoint braking torque distribution V1/2), preferably remains connected to master brake cylinder 14. In contrast, the other brake circuit 16a of the two brake circuits 16a and 16b, which is associated with another axle A1 of the two axles A1 and A2 of the vehicle and which is decelerated less for the generator brake force distribution than for the setpoint brake force distribution (i.e., is decelerated less for the generator braking torque distribution than for setpoint braking torque distribution V1/2), is decoupled from master brake cylinder 14 with the aid of its closed changeover valve 18a. Since a comparatively large amount of brake fluid is displaced into storage chambers 26a and 26b until the requested setpoint total brake force exceeds the maximum achievable recuperative brake force, the master brake cylinder pressure is relatively low compared to the requested setpoint total brake force. A brake pressure that is built up in wheel brake cylinders 10a and 12a of decoupled brake circuit 16a is generally higher than the brake pressure effectuated in wheel brake cylinders 10b and 12b of connected brake circuit 16b. An improved brake force distribution may be effectuated via the buildup of the higher brake pressure in wheel brake cylinders 10a and 12a of decoupled brake circuit 16a that is associated with axle A1, which is decelerated less for the generator braking torque distribution than for the setpoint braking torque distribution.

Figure 2B:
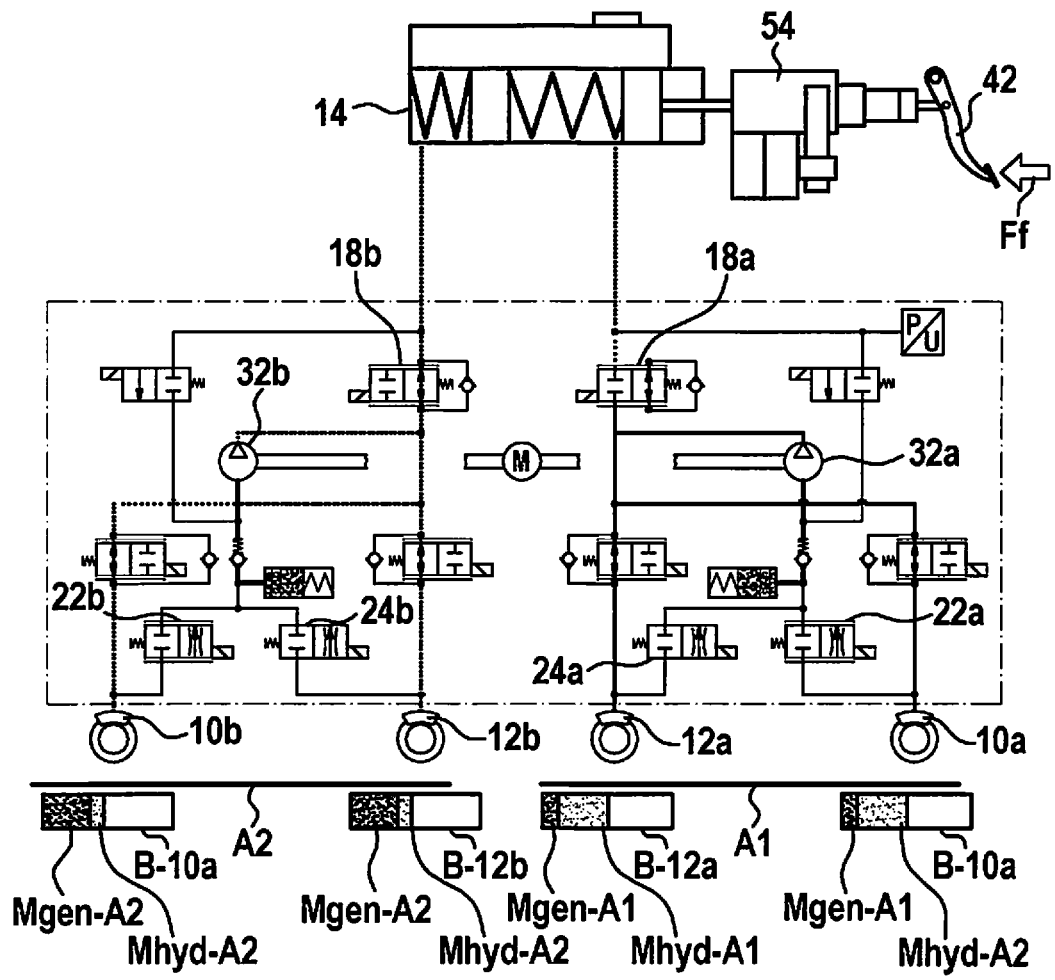
Figure 2B:
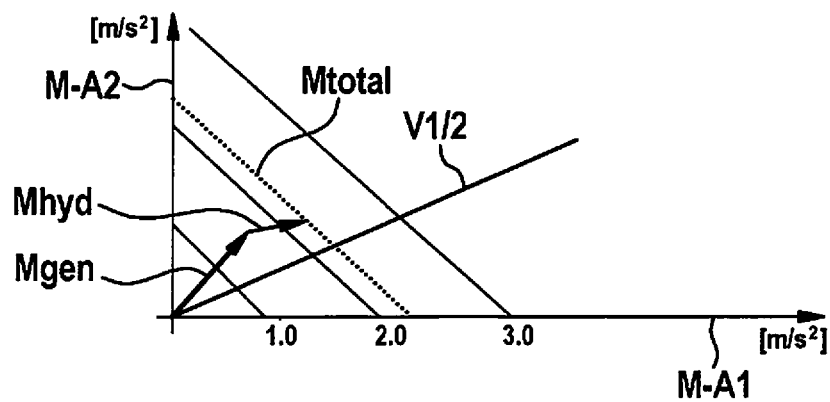
Figure 2C:
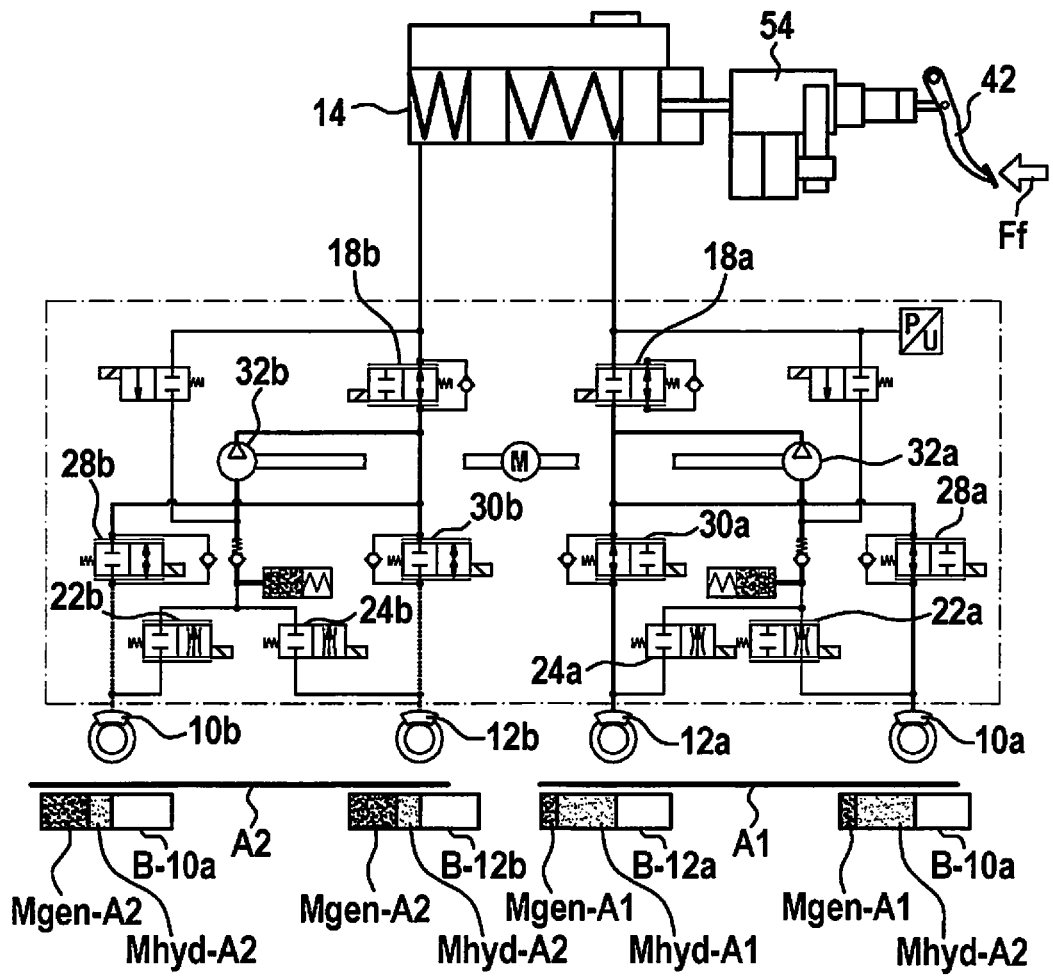
Figure 2C:
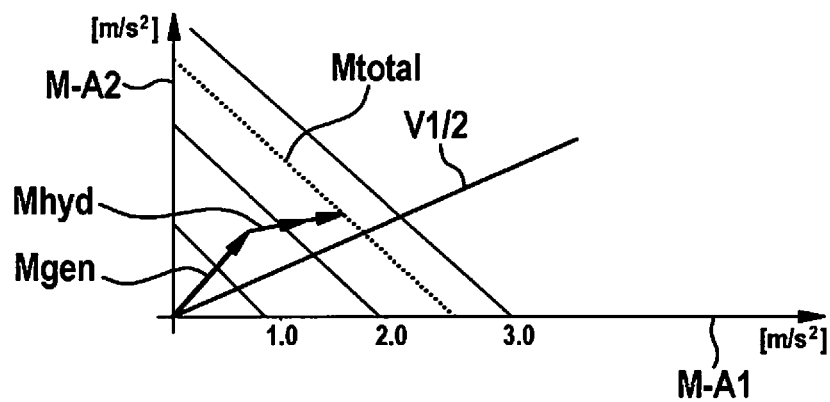

FIGS. 2Ca and 2Cb show a control strategy for a situation in which the driver brakes subsequent to/during the method stage in FIGS. 2Ba and 2Bb (afterbraking recognition). (The same control strategy may also be used when the driver increases his/her braking intent during an axle-specific blending.) The aim of this control strategy is to ensure that the volume additionally introduced by the driver is distributed over both brake circuits 16a and 16b, despite the pressure difference that is present between brake circuit 16b connected to master brake cylinder 14, and decoupled brake circuit 16a, thus also resulting in an increased brake force at both axles A1 and A2.

At the same time, with the aid of the control strategy the aim is to ensure that a pressure difference continues to be present between the two brake circuits 16a and 16b. Brake circuit 16a, previously decoupled from master brake cylinder 14, is reconnected to master brake cylinder 14 by opening its changeover valve 18a, so that the brake pressure in its wheel brake cylinders 10a and 12a corresponds to the master brake cylinder pressure. With the aid of wheel inlet valves 28b and 30b of the other brake circuit 16b, the brake pressure in its wheel brake cylinders 10b and 12b (which is different from the master brake cylinder pressure) may be set (lower) so that the brake pressure in wheel brake cylinders 10b and 12b, which are decoupled from master brake cylinder 14 with the aid of closed wheel inlet valves 28b and 30b, corresponds to a deviation of a sum of the generator brake force and the hydraulic partial brake force of wheel brake cylinders 10a and 12a that are connected to master brake cylinder 14, from the requested setpoint total brake force (i.e., a deviation of a sum of generator braking torque Mgen and hydraulic partial braking torque Mhyd-A1 of wheel brake cylinders 10a and 12a that are connected to master brake cylinder 14, from requested setpoint total braking torque Mtotal).

Additional volume may be delivered from the two storage chambers 26a and 26b by operating both pumps 32a and 32b. Alternatively, brake fluid may also be displaced into at least one of storage chambers 26a and 26b via at least one wheel outlet valve 10a. The operation of brake booster 54 may be adjusted accordingly.

Figure 2D:
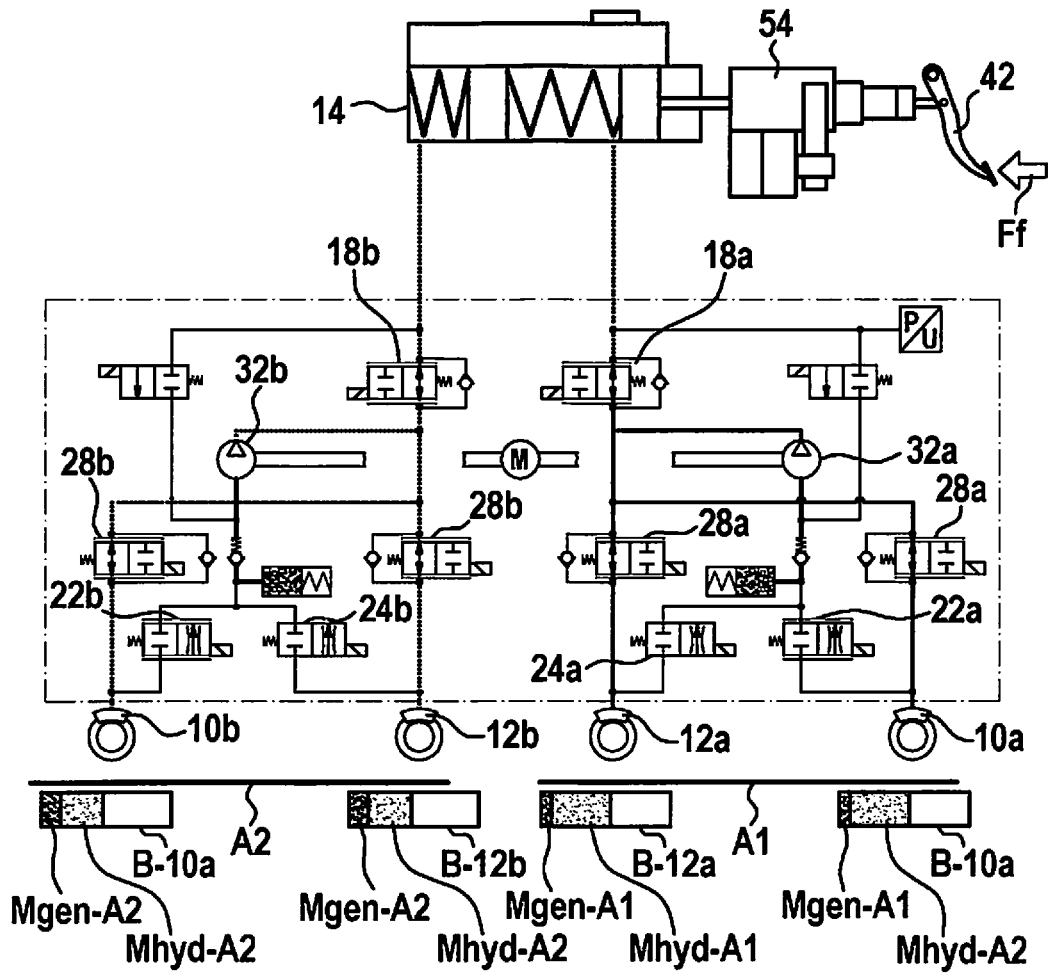
Figure 2D:
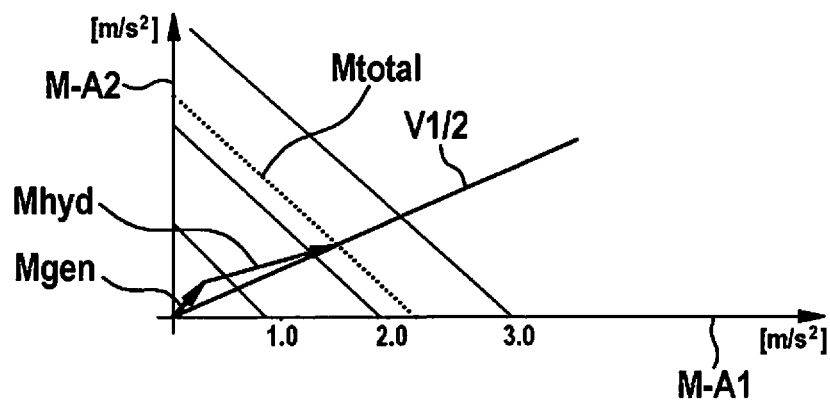

FIGS. 2Da and 2Db show another control strategy (which may be carried out in the method stage in FIGS. 2Ba and 2Bb or in the method stage in FIGS. 2Ca and 2Cb) that is advantageous when there is a decrease in the maximum achievable recuperative brake force with the aid of the at least one generator (i.e., maximum achievable recuperative braking torque Mgen0). (The maximum achievable recuperative brake force decreases sharply in particular when the vehicle comes to a standstill.) However, the decrease in the maximum achievable recuperative brake force may be compensated for/replaced by increasing the brake pressures in wheel brake cylinders 10a, 10b, 12a, and 12b. This takes place in that only one of the two changeover valves 18a and 18b is controlled/held in an open state, while pumps 32a and 32b are controlled in such a way that pumps 32a and 32b deliver additional brake fluid volume from their associated storage chambers 26a and 26b. By closing or keeping closed the changeover valve 18a of decoupled brake circuit 16a, the brake pressure in wheel brake cylinders 10a and 12a of decoupled brake circuit 16a is set in such a way that it corresponds to a deviation of a sum of the generator brake force and the hydraulic partial brake force of wheel brake cylinders 10b and 12b of brake circuit 16b that is connected to master brake cylinder 14, from the requested setpoint total brake force (i.e., a deviation of a sum of generator braking torque Mgen and hydraulic partial braking torque Mhyd-A2 of wheel brake cylinders 10b and 12b of brake circuit 16b that is connected to master brake cylinder 14, from requested setpoint total braking torque Mtotal). (The brake pressure in wheel brake cylinders 10b and 12b of brake circuit 16b that is connected to master brake cylinder 14 is equal to the master brake cylinder pressure.) A pressure difference between the brake pressure in wheel brake cylinders 10a and 12a of decoupled brake circuit 16a and the brake pressure in wheel brake cylinders 10b and 12b of brake circuit 16b that is connected to master brake cylinder 14 decreases during this control strategy. During this control strategy, the floating piston therefore moves until it is once again in its original actuation position/starting position when the generator brake force is discontinued. As soon as the same brake pressure is present in all wheel brake cylinders 10a, 10b, 12a, and 12b, a valve or return delivery control is no longer necessary.

For this control strategy as well, brake circuit 16b of the two brake circuits 16a and 16b, which is associated with axle A2 of the two axles A1 and A2 and which is decelerated more intensely for the generator brake force distribution than for the setpoint brake force distribution, preferably remains connected to master brake cylinder 14, while the other brake circuit 16a of the two brake circuits 16a and 16b, which is associated with the other axle A1 of the two axles A1 and A2 of the vehicle and which is decelerated less for the generator brake force distribution than for the setpoint brake force distribution, is decoupled from master brake cylinder 14 with the aid of its closed changeover valve 18a. An optimized brake force distribution may thus be achieved during the entire brake application up to the standstill, in order to provide a desired vehicle stability and preferably an optimal driving performance.

In addition, the method steps depicted with the aid of FIGS. 2Da and 2Db may be combined with an increase in the boosting force and/or a reduction in the counterforce of brake booster 54 in order to compensate for a pressure increase in brake circuits 16a and 16b. The driver thus continues to have the accustomed brake actuation feel (pedal feel).

FIGS. 3a through 3e show coordinate systems for explaining a second specific embodiment of the method for operating a braking system of a vehicle.

The method described below may be carried out with numerous different braking systems, each of the braking systems including a master brake cylinder 14, a first brake circuit 16a with a first storage chamber 26a, a first wheel brake cylinder 10a, and a second wheel brake cylinder 12a, and a second brake circuit 16b with a second storage chamber 26b, a third wheel brake cylinder 10b, and a fourth wheel brake cylinder 12b, and first wheel brake cylinder 10a being hydraulically connected to first storage chamber 26a via a continuously adjustable first wheel outlet valve 22a, second wheel brake cylinder 12a being hydraulically connected to first storage chamber 26a via a second wheel outlet valve 24a, third wheel brake cylinder 10b being hydraulically connected to second storage chamber 26b via a continuously adjustable third wheel outlet valve 22b, and fourth wheel brake cylinder 12b being hydraulically connected to second storage chamber 26b via a fourth wheel outlet valve 24b. The braking system described above is used here once again, strictly by way of example.

The abscissas of the coordinate systems in FIGS. 3a through 3d in each case are time axis t. An ordinate of the coordinate systems in FIGS. 3a through 3d depicts a braking torque B, an outlet valve current signal |10a+10b of continuously adjustable wheel outlet valves 10a and 10b, a changeover valve current signal |18a+18b of changeover valves 18a and 18b, and a pump current signal I32a+32b of pumps 32a and 32b. A total first axle partial braking torque M-A1 exerted on a first axle A1 is represented by an abscissa of the coordinate system in FIG. 3e, while an ordinate of the coordinate system in FIG. 3e depicts a total second axle partial braking torque M-A2 exerted on a second axle A2. It is pointed out that the method described here may be carried out in a vehicle with a front-wheel drive as well as in a vehicle with a rear-wheel drive or in a vehicle with an all-wheel drive. For all types of vehicles, the method described here allows adequate blending in both brake circuits 16a and 16b as needed.

In the method depicted with the aid of FIGS. 3a through 3e, beginning at a time t0, a driver of the vehicle actuates brake actuating element 42, thereby displacing brake fluid from master brake cylinder 14 of the braking system into the two connected brake circuits 16a and 16b. Since the at least one generator of the vehicle is not yet available at time t0, the brake fluid volume pressed out from master brake cylinder 14 is displaced into wheel brake cylinders 10a, 10b, 12a, and 12b of connected brake circuits 16a and 16b, and thus effectuates a first hydraulic partial braking torque Mhyd-A1 of wheel brake cylinders 10a and 10b of first brake circuit 16a, and a second hydraulic partial braking torque Mhyd-A2 of wheel brake cylinders 10b and 12b of second brake circuit 16b. A sum of hydraulic partial braking torques Mhyd-A1 and Mhyd-A2 is preferably equal to a setpoint total braking torque Mtotal requested by the driver.

Only beginning at a time t1 is the at least one generator of the vehicle usable for recuperative braking. However, despite the delayed usability of the at least one generator, in the method described here it is still possible to convert kinetic energy of the vehicle into storable electrical energy with the aid of a recuperative braking operation. To prevent an exceedance of setpoint total braking torque Mtotal that is predefined by the driver, brake fluid is displaced into storage chambers 26a and 26b, despite the significant pressure that is already present in brake circuits 16a and 16b. For this purpose, beginning at time t1 at least the continuously adjustable first wheel outlet valve 22a and the continuously adjustable third wheel outlet valve 22b are energized in such a way that the brake pressure present in all wheel brake cylinders 10a, 10b, 12a, and 12b is (virtually) completely reduced up to a time t3. The continuously adjustable/controllable wheel outlet valves 10a and 10b (pressure relief valves) may be opened (continuously/by control) even when the braking system is already under pressure, also without an undesirable pressure generation, and thus allow a noiseless pressure reduction in brake circuits 16a and 16b. A significant increase in recuperation efficiency is thus possible during actual driving operation, in particular for drive trains in which the at least one generator is not available for a recuperative braking operation until well after the start of braking.

Prior to opening at least first wheel outlet valve 22a and third wheel outlet valve 22b, and with first wheel outlet valve 22a closed, second wheel outlet valve 24a closed, third wheel outlet valve 22b closed, and fourth wheel outlet valve 24b closed, it may be ascertained whether it is more advantageous to open only the continuously adjustable first wheel outlet valve 22a and the continuously adjustable third wheel outlet valve 22b (and to keep second wheel outlet valve 24a as a switching valve, and fourth wheel outlet valve 24b as a switching valve, closed), or to open all wheel outlet valves 22a, 22b, 24a, and 24b. For this purpose, at least one pressure is ascertained in at least one partial volume of the braking system. If the at least one pressure is below at least one predefined threshold value, first wheel outlet valve 22a, second wheel outlet valve 24a, third wheel outlet valve 22b, and fourth wheel outlet valve 24b are each/all controlled into an at least partially open state. However, if the at least one pressure is above the at least one predefined threshold value, only first wheel outlet valve 22a and third wheel outlet valve 22b are in each case controlled into an at least partially open state, and second wheel outlet valve 24a and fourth wheel outlet valve 24b are kept closed. The at least one threshold value may be predefined in such a way that even a (simultaneous) opening of all wheel outlet valves 22a, 22b, 24a, and 24b does not trigger noise when there is a pressure load on the braking system below the at least one threshold value. If possible, a large amount of brake fluid may thus be quickly displaced into storage chambers 26a and 26b, while at the same time, excessive noise levels for vehicle occupants are prevented for all blending situations.

If the driver requests a constant high setpoint total braking torque Mtotal beginning at a time t2, this has no effect at all on the displaceability of the brake fluid volume that is pressed out from master brake cylinder 14 into storage chambers 26a and 26b. Beginning at time t3, the setpoint total braking torque requested by the driver may be applied as 100% generator braking torque Mgen. If the displacement of the brake fluid that is pressed out from master brake cylinder 14 into storage chambers 26a and 26b of brake circuits 16a and 16b is carried out within the jump-in range, this operation has no repercussions on brake actuating element 42, and the driver thus does not perceive the blending operation. However, if the blending is carried out after an exceedance of the jump-in range has already occurred, so that a closed force fit between brake actuating element 42 and master brake cylinder 14 is present, with the aid of an active/electromechanical brake booster 54 of the braking system it may thus be ensured that the driver still does not perceive the blending operation. For this purpose, by reducing a boosting force of brake booster 54 (which assists, in terms of force, in the actuation of brake actuating element 42 by the driver), or by effectuating a counterforce of brake booster 54 (which counteracts the actuation of brake actuating element 42 by the driver), the brake actuation feel (pedal feel) of the driver may be influenced in such a way that driver brake force Ff to be applied by the driver for adjusting brake actuating element 42 continues to correspond to a standard characteristic curve.

Beginning at a time t4, maximum achievable recuperative braking torque Mgen0 of the at least one generator decreases, since the vehicle due to its constant deceleration no longer has sufficient speed for unlimited use of the at least one generator. However, a response may be made to the decrease in maximum achievable recuperative braking torque Mgen0 over time with the aid of a brake pressure buildup in wheel brake cylinders 10a, 10b, 12a, and 12b of the braking system. For this purpose, beginning at time t4, brake fluid is pumped from storage chambers 26a and 26b into wheel brake cylinders 10a, 10b, 12a, and 12b of both brake circuits 16a and 16b with the aid of associated pumps 32a and 32b. As is apparent with reference to the coordinate system in FIG. 3c, this does not require control of change-over valves 18a and 18b of the braking system.

Beginning at a time t5, maximum achievable recuperative braking torque Mgen0 and regenerative braking torque Mgen of the at least one generator are zero, and the vehicle is decelerated solely with the aid of hydraulic partial braking torques Mhyd-A1 and Mhyd-A2 that are effectuated by its wheel brake cylinders 10a, 10b, 12a, and 12b. Beginning at time t5, a brake force distribution exerted on the two axles A1 and A2 of the vehicle thus once again corresponds to setpoint brake force distribution V1/2, until the vehicle is brought to a standstill at a time t6. Setpoint brake force distribution V1/2 may be a setpoint brake force distribution installed in the vehicle and/or an ideal setpoint brake force distribution. Setpoint brake force distribution V1/2 may represent a force fit utilization on both axles or a (front- or rear-biased) overbraking of one of the two axles, for example to influence driving dynamics (enhancing agility by overbraking the particular axle).

All of the methods described above for decelerating/slowing the vehicle may be advantageously utilized for converting kinetic energy of the vehicle into electrical energy, without the setpoint total brake force desired by the driver being exceeded. It is expressly pointed out that no "mechanical free travel" is required for blending the braking effect of the at least one generator when any of the methods described here are carried out. Instead, an "electric free travel" is achievable by opening at least first wheel outlet valve 10a and third wheel outlet valve 10b. Therefore, the blendability of the braking effect of the at least one generator is not limited to any deceleration range.

What is claimed is:

1. A braking system for a vehicle, comprising:
   a master brake cylinder;
   a first brake circuit including:
      a first storage chamber,
      a first wheel brake cylinder,
      a first wheel outlet valve,
      a second wheel outlet valve, and
      a second wheel brake cylinder, wherein:
         the first wheel brake cylinder is hydraulically connected to the first storage chamber via the first wheel outlet valve, and
         the second wheel brake cylinder is hydraulically connected to the first storage chamber via the second wheel outlet valve; and
   a second brake circuit including:
      a second storage chamber,
      a third wheel brake cylinder, and
      a fourth wheel brake cylinder,
      a third wheel outlet valve,
      a fourth wheel outlet valve, wherein
         the third wheel brake cylinder is hydraulically connected to the second storage chamber via the third wheel outlet valve,
         the fourth wheel brake cylinder is hydraulically connected to the second storage chamber via the fourth wheel outlet valve,
         each one of the first wheel outlet valve and the third wheel outlet valve is a respective continuously adjustable valve;
   a brake actuating element connected to the master brake cylinder; and
   a control device, wherein:
      when a setpoint total brake force requested by a driver of the vehicle via an actuation by the driver of the brake actuating element is achievable, the control device, at least partially controls each of at least the first wheel outlet valve and the third wheel outlet valve into an at least partially open state, so that at least a portion of a brake fluid volume that is displaced from the master brake cylinder into the first brake circuit by actuating the brake actuating element is transferable into the first storage chamber, and at least a portion of a brake fluid volume that is displaced from the master brake cylinder into the second brake circuit by actuating the brake actuating element is transferable into the second storage chamber.

2. The braking system as recited in claim 1, wherein each one of the second outlet valve and the fourth outlet valve is a respective switching valve.

3. The braking system as recited in claim 1, wherein:
   the control device ascertains, taking into account a brake actuation intensity signal concerning an actuation intensity of the actuation of the brake actuating element by the driver, whether the requested setpoint total brake force is at least partially achievable with the aid of the at least one generator, and
   the control device controls the at least one generator in such a way that the requested setpoint total brake force is at least partially achievable with the aid of the at least one generator.

4. The braking system as recited in claim 3, further comprising:
   a first changeover valve associated with the first brake circuit; and
   a second changeover valve associated with the second brake circuit, wherein:
   the control device, as long as the requested setpoint total brake force is below a maximum achievable recuperative brake force with the aid of the at least one generator, controls at least each of the first wheel outlet valve and the third wheel outlet valve into an at least partially open state in each case, and controls the at least one generator in such a way that the requested setpoint total brake force is achieved with the aid of the at least one generator,
   as soon as the requested setpoint total brake force exceeds the maximum achievable recuperative brake force, the control device controls the first wheel outlet valve, the second wheel outlet valve, the third wheel outlet valve, and the fourth wheel outlet valve into a closed state, and
   while the second brake circuit remains connected, via an open second changeover valve, to the master brake cylinder, the control device decouples the first brake circuit from a master brake cylinder pressure in the master brake cylinder by closing the first changeover valve in order to set or build up a brake pressure in the first and the second wheel brake cylinders of the decoupled first brake circuit, the brake pressure corresponding to a deviation of a sum of a generator brake force of the at least one generator and a hydraulic partial brake force of the third and the fourth wheel brake cylinders of the second brake circuit connected to the master brake cylinder, from the requested setpoint total brake force.

5. The braking system as recited in claim 4, wherein:
   a generator brake force distribution that is effectuated on a first axle and a second axle of the vehicle with the aid of the at least one generator deviates from a predefined setpoint brake force distribution, and
   as soon as the requested setpoint total brake force exceeds the maximum achievable recuperative brake force, while the second brake circuit associated with the second axle that is decelerated more intensely for the generator brake force distribution than for the setpoint brake force distribution remains connected to the master brake cylinder with the aid of the open second changeover valve, the control device decouples the first brake circuit, associated with the first axle that is decelerated less for the generator brake force distribution than for the setpoint brake force distribution, from the master brake cylinder with the aid of the closed first changeover valve.

6. The braking system as recited in claim 4, wherein:
as soon as the maximum achievable recuperative brake force decreases, the control device:
controls first and second pumps in such a way that additional brake fluid volume is deliverable from the first storage chamber and the second storage chamber with the aid of the first and the second pumps, and
by closing or maintaining as closed only the first changeover valve, sets the brake pressure in the first and the second wheel brake cylinders of the decoupled first brake circuit in such a way that the brake pressure corresponds to the deviation of the sum of the generator brake force and the hydraulic partial brake force of the third and the fourth wheel brake cylinders of the second brake circuit connected to the master brake cylinder, from the requested setpoint total brake force.

7. The braking system as recited in claim 1, wherein:
the control device, with the first wheel outlet valve closed, the second wheel outlet valve as a switching valve closed, the third wheel outlet valve closed, and the fourth wheel outlet valve as a switching valve closed, compares at least one pressure signal concerning at least one pressure in at least a partial volume of the braking system to at least one predefined threshold value signal, prior to controlling at least each of the first wheel outlet valve and the third wheel outlet valve into an at least a partially open state,
if the at least one pressure signal is below the at least one threshold value signal, the control device controls each of the first wheel outlet valve, the second wheel outlet valve, the third wheel outlet valve, and the fourth wheel outlet valve into an at least partially open state, and
if the at least one pressure signal is at or above the threshold value signal, the control device controls only the first wheel outlet valve and the third wheel outlet valve into an at least partially open state, and keeps the second wheel outlet valve and the fourth wheel outlet valve closed.

8. A method for operating a braking system of a vehicle that includes a master brake cylinder, a first brake circuit with a first storage chamber, a first wheel brake cylinder, and a second wheel brake cylinder, the first wheel brake cylinder being hydraulically connected to the first storage chamber via a continuously adjustable first wheel outlet valve, and the second wheel brake cylinder being hydraulically connected to the first storage chamber via a second wheel outlet valve, and that includes a second brake circuit with a second storage chamber, a third wheel brake cylinder, and a fourth wheel brake cylinder, the third wheel brake cylinder being hydraulically connected to the second storage chamber via a continuously adjustable third wheel outlet valve, and the fourth wheel brake cylinder being hydraulically connected to the second storage chamber via a fourth wheel outlet valve, the method comprising:
when a brake actuating element that is connected to the master brake cylinder is actuated by a driver of the vehicle, ascertaining whether a setpoint total brake force requested by the driver by actuating the brake actuating element is at least partially achievable with the aid of at least one generator of the vehicle; and
if the requested setpoint total brake force is at least partially achievable with the aid of the at least one generator:
controlling the at least one generator in such a way that the requested setpoint total brake force is at least partially achieved with the aid of the at least one generator,
opening at least the first wheel outlet valve in order to transfer at least a portion of a brake fluid volume, displaced from the master brake cylinder into the first brake circuit by actuating the brake actuating element, into the first storage chamber,[and
opening at least the third wheel outlet valve in order to transfer at least a portion of a brake fluid volume, displaced from the master brake cylinder in the second brake circuit by actuating the brake actuating element, into the second storage chamber.

9. The method as recited in claim 8, further comprising:
prior to opening at least the first wheel outlet valve and the third wheel outlet valve, and with the first wheel outlet valve closed, the second wheel outlet valve as a switching valve closed, the third wheel outlet valve closed, and the fourth wheel outlet valve as a switching valve closed, ascertaining at least one pressure in at least a partial volume of the braking system; and
if the at least one pressure is below at least one predefined threshold value, controlling the first wheel outlet valve, the second wheel outlet valve, the third wheel outlet valve, and the fourth wheel outlet valve into an at least partially open state; and
if the at least one pressure is above the at least one predefined threshold value, controlling only the first wheel outlet valve and the third wheel outlet valve into an at least partially open state, and keeping closed the second wheel outlet valve and the fourth wheel outlet valve.

10. The method as recited in claim 8, wherein the first brake circuit is associated with a first changeover valve and the second brake circuit is associated with a second changeover valve, the method further comprising:
as long as the requested setpoint total brake force is below a maximum achievable recuperative brake force with the aid of the at least one generator, controlling at least each of the first wheel outlet valve and the third wheel outlet valve into an at least partially open state, and controlling the at least one generator in such a way that the requested setpoint total brake force is achieved with the aid of the at least one generator;
as soon as the requested setpoint total brake force exceeds the maximum achievable recuperative brake force, controlling the first wheel outlet valve, the second wheel outlet valve, the third wheel outlet valve, and the fourth wheel outlet valve into a closed state; and
while the second brake circuit remains connected, via an open second changeover valve, to the master brake cylinder, decoupling the first brake circuit from the master brake cylinder by closing the first changeover valve, wherein a brake pressure is set or built up in the first and the second wheel brake cylinders of the decoupled first brake circuit, the brake pressure corresponding to a deviation of a sum of a generator brake force of the at least one generator and a hydraulic partial brake force of the third and the fourth wheel brake cylinders of the second brake circuit connected to the master brake cylinder, from the requested setpoint total brake force.

11. A method for operating a braking system of a vehicle that includes a master brake cylinder, a first brake circuit with a first storage chamber, a first wheel brake cylinder, and a second wheel brake cylinder, the first wheel brake cylinder being hydraulically connected to the first storage chamber via a continuously adjustable first wheel outlet valve, and the second wheel brake cylinder being hydraulically connected to the first storage chamber via a second wheel outlet valve, and that includes a second brake circuit with a second storage chamber, a third wheel brake cylinder, and a fourth wheel brake cylinder, the third wheel brake cylinder being hydraulically connected to the second storage chamber via a continuously adjustable third wheel outlet valve, and the fourth wheel brake cylinder being hydraulically connected to the second storage chamber via a fourth wheel outlet valve, wherein the first brake circuit is associated with a first changeover valve and the second brake circuit is associated with a second changeover valve, the method comprising:

when a brake actuating element that is connected to the master brake cylinder is actuated by a driver of the vehicle, ascertaining whether a setpoint total brake force requested by the driver by actuating the brake actuating element is at least partially achievable with the aid of at least one generator of the vehicle;

if the requested setpoint total brake force is at least partially achievable with the aid of the at least one generator:
controlling the at least one generator in such a way that the requested setpoint total brake force is at least partially achieved with the aid of the at least one generator,
opening at least the first wheel outlet valve in order to transfer at least a portion of a brake fluid volume, displaced from the master brake cylinder into the first brake circuit by actuating the brake actuating element, into the first storage chamber, and
opening at least the third wheel outlet valve in order to transfer at least a portion of a brake fluid volume, displaced from the master brake cylinder in the second brake circuit by actuating the brake actuating element, into the second storage chamber;

as long as the requested setpoint total brake force is below a maximum achievable recuperative brake force with the aid of the at least one generator, controlling at least each of the first wheel outlet valve and the third wheel outlet valve into an at least partially open state, and controlling the at least one generator in such a way that the requested setpoint total brake force is achieved with the aid of the at least one generator; and as soon as the requested setpoint total brake force exceeds the maximum achievable recuperative brake force, controlling the first wheel outlet valve, the second wheel outlet valve, the third wheel outlet valve, and the fourth wheel outlet valve into a closed state, the second brake circuit remaining connected, via an open second changeover valve, to the master brake cylinder, while the first brake circuit is decoupled from the master brake cylinder by closing the first changeover valve, a brake pressure being set or built up in the first and the second wheel brake cylinders of the decoupled first brake circuit that corresponds to a deviation of a sum of a generator brake force of the at least one generator and a hydraulic partial brake force of the third and the fourth wheel brake cylinders of the second brake circuit connected to the master brake cylinder, from the requested setpoint total brake force.

12. The method as recited in claim 11, further comprising: effectuating a generator brake force distribution on a first axle and a second axle of the vehicle that deviates from a predefined setpoint brake force distribution with the aid of the at least one generator, wherein as soon as the requested setpoint total brake force exceeds the maximum achievable recuperative brake force, the second brake circuit that is associated with the second axle that is decelerated more intensely for the generator brake force distribution than for the setpoint brake force distribution remains connected, with the aid of the open second changeover valve, to the master brake cylinder, while the first brake circuit, associated with the first axle that is decelerated less for the generator brake force distribution than for the setpoint brake force distribution, is decoupled from the master brake cylinder with the aid of the closed first changeover valve.

13. The method as recited in claim 11, wherein when the driver subsequently brakes into the braking system, with the second brake circuit connected to the master brake cylinder via the open second changeover valve, and with the first brake circuit decoupled from the master brake cylinder with the aid of the closed first changeover valve, the first brake circuit, previously decoupled from the master brake cylinder, is reconnected to the master brake cylinder by opening the first changeover valve, and with the aid of first and second wheel inlet valves of the second brake circuit, the brake pressure in the third and the fourth wheel brake cylinders is set in such a way that the brake pressure in the third and the fourth wheel brake cylinders that are decoupled from the master brake cylinder with the aid of the closed first and second wheel inlet valves corresponds to a deviation of a sum of the generator brake force and a hydraulic partial brake force of the first and the second wheel brake cylinders connected to the master brake cylinder, from the requested setpoint total brake force.

14. The method as recited in claim 11, wherein as soon as the maximum achievable recuperative brake force decreases, first and second pumps are controlled in such a way that the first and the second pumps deliver additional brake fluid volume from the first storage chamber and the second storage chamber, and by closing or keeping closed only the first changeover valve, the brake pressure in the first and the second wheel brake cylinders of the decoupled first brake circuit is set in such a way that the brake pressure corresponds to a deviation of a sum of the generator brake force and the hydraulic partial brake force of the third and the fourth wheel brake cylinders of the second brake circuit connected to the master brake cylinder, from the requested setpoint total brake force.

* * * * *